United States Patent
He et al.

(10) Patent No.: US 9,954,610 B2
(45) Date of Patent: Apr. 24, 2018

(54) IN-BAND NOISE DETERMINATION ON OPTICAL COMMUNICATION SIGNALS

(71) Applicant: EXFO INC., Quebec (CA)

(72) Inventors: Gang He, Quebec (CA); Daniel Gariepy, Quebec (CA)

(73) Assignee: EXFO Inc., Quebec (CA)

( * ) Notice: Subject to any disclaimer, the term of this patent is extended or adjusted under 35 U.S.C. 154(b) by 107 days.

(21) Appl. No.: 14/932,375

(22) Filed: Nov. 4, 2015

(65) Prior Publication Data

US 2016/0142135 A1    May 19, 2016

Related U.S. Application Data

(60) Provisional application No. 62/075,506, filed on Nov. 5, 2014.

(51) Int. Cl.
*H04B 10/079*    (2013.01)

(52) U.S. Cl.
CPC .............................. *H04B 10/07953* (2013.01)

(58) Field of Classification Search
CPC ............................................. H04B 10/07953
See application file for complete search history.

(56) References Cited

U.S. PATENT DOCUMENTS

| | | | |
|---|---|---|---|
| 6,636,306 B2 | 10/2003 | He et al. | |
| 6,898,001 B2 * | 5/2005 | Ishihara | H04B 10/0731 359/337 |
| 9,008,508 B2 | 4/2015 | Liu | |
| 9,596,027 B2 * | 3/2017 | He | H04B 10/07953 |
| 2003/0072513 A1 | 4/2003 | Glingener et al. | |
| 2004/0247319 A1 | 12/2004 | Melman | |

(Continued)

FOREIGN PATENT DOCUMENTS

| WO | WO2008122123 | 10/2008 |
|---|---|---|
| WO | WO2011020195 | 2/2011 |

OTHER PUBLICATIONS

Vocondio et al., "On Nonlinear Distortions of Highly Dispersive Optical Coherent Systems", Optics Express, vol. 20, No. 2, pp. 1022-1032 (Jan. 6, 2012).

(Continued)

*Primary Examiner* — Nathan Cors
(74) *Attorney, Agent, or Firm* — Helene Chotard

(57) ABSTRACT

There are provided methods and devices for determining a quality parameter characterizing an optical communication signal, the methods being performed by signal detection devices. At the transmitting end, there are obtained a signal power P1 of a first optical signal, a signal power P2 of a second optical signal, a signal power P3 of a third optical signal, optionally a signal power P4 of a fourth optical signal, and a total signal power Ps of a channel where the first, second, third and optional fourth optical signals are located. At a detection point, there are further obtained a signal power P1' of the first optical signal, a signal power P2' of the second optical signal, a signal power P3' of the third optical signal and optionally a signal power P4' of the fourth optical signal. There are then determined a signal deformation factor SDF and/or an optical signal to ASE noise ratio OSNR from the obtained signal powers.

7 Claims, 9 Drawing Sheets

(56) References Cited

U.S. PATENT DOCUMENTS

| | | | |
|---|---|---|---|
| 2005/0201757 A1* | 9/2005 | Bohn | H04B 10/2507 |
| | | | 398/149 |
| 2012/0201533 A1 | 8/2012 | Gariepy et al. | |
| 2012/0219285 A1* | 8/2012 | Dahan | H04B 10/07953 |
| | | | 398/26 |
| 2013/0028597 A1 | 1/2013 | Ye et al. | |
| 2015/0110486 A1* | 4/2015 | Sunnerud | H04J 14/06 |
| | | | 398/26 |
| 2015/0155935 A1* | 6/2015 | Oda | H04B 10/07953 |
| | | | 398/26 |
| 2015/0304025 A1* | 10/2015 | Liu | H04B 10/07951 |
| | | | 398/28 |
| 2016/0072579 A1 | 3/2016 | Schroeder | |
| 2017/0033866 A1* | 2/2017 | Wang | H04B 10/077 |

OTHER PUBLICATIONS

Gariepy et al. "Non-Intrusive Measurement of In-Band OSNR of High Bitrate Polarization-Multiplexed Signals", Opt. Fiber Technol., vol. 17, Issue 5, pp. 518-522 (Oct. 2011).

Lee et al. "OSNR Monitoring Technique Using Polarization-Nulling Method", IEEE Photonics Technology Letters, vol. 13, No. 1, pp. 88-90 (Jan. 2001).

* cited by examiner

IN-BAND NOISE DETERMINATION ON OPTICAL COMMUNICATION SIGNALS

CROSS-REFERENCE TO RELATED APPLICATIONS

This application claims priority under 35 USC § 119(e) of U.S. provisional patent application 62/075,506 filed Nov. 5, 2014; the specification of which is hereby incorporated by reference.

TECHNICAL FIELD

The invention relates to the determination of quality parameters, such as in-band Optical Signal to Noise Ratio (OSNR), of optical communication signals.

BACKGROUND OF THE ART

In order to maximize the information content transmitted over a prescribed spectral bandwidth, polarization multiplexing (also known as "dual-polarization") is being increasingly used with new transmission formats. The underlying idea is that the spectral density (conveniently measured in units of bits/Hz) can be effectively doubled by employing two orthogonally polarized data-carrying signal components sharing the same optical signal bandwidth. Normally, these two orthogonally polarized components are transmitted with substantially the same intensity, rendering the total resultant light effectively unpolarized as seen from a test-and-measurement instrument having an electronic detection bandwidth significantly lower than the symbol rate of the polarization-multiplexed signal, such as is normally the case with Optical Spectrum Analyzers (OSA).

The Optical Signal to ASE Noise Ratio (OSNR) is a conventional measurable characteristic of the quality of a signal carried by an optical telecommunication link. Under normal and proper operating conditions, the OSNR of an optical communication link is typically high, often in excess of 15 dB or 20 dB, or even greater. The dominant component of the noise in an optical communication link is typically unpolarized Amplified Spontaneous Emission (ASE) noise, which is a spectrally broadband noise source contributed by the optical amplifiers in the link.

A method of measuring in-band OSNR, which is applicable to polarization-multiplexed signals, was proposed by LIU (see U.S. Pat. No. 9,008,508). This method characterizes an optical communication signal at the receiver end based on similar measurements performed both at the transmitter end, i.e. before ASE is introduced on the signal, and at the receiver end, where the OSNR is to be characterized. It compares the signal level filtered at two distinct wavelengths at the transmitter end to the same measured at the receiver end to determine the OSNR. An important limitation is that the proposed method is based on the assumption that the signal spectrum does not deform during transmission.

However, spectral deformations, mostly induced by Non-Linear Effects (NLE), have become more frequent in the case of new deployments using polarization multiplexing, because optimum performance in Bit Error Rate (BER) is obtained by increasing the power propagating within the optical fiber to such an extent that non-linear effects can no longer be neglected. The method proposed by LIU is impacted by signals subjected to NLE-induced spectral deformations. Furthermore, overall system performance in terms of BER is not only affected by the ASE-noise level but also from such non-linear effects (see Vacondio et al, "On nonlinear distorsions of highly dispersive optical coherent systems", Optics Express, Vol. 20, No. 2, pp. 1022-1032 (2012)). Signal quality therefore cannot be assessed based only on the conventionally measured OSNR because proper performance indicators should also account for NLE-induced distortions.

There is therefore a need for a method and a device to determine quality parameters characterizing polarization-multiplexed signals subject to NLE-induced spectral deformation.

SUMMARY

There is provided methods and devices to determine the in-band OSNR or other quality parameters characterizing a polarization-multiplexed optical communication signal in presence of NLE-induced spectral deformation.

The provided methods and devices are extensions and improvements of the method proposed by LIU in U.S. Pat. No. 9,008,508 (hereby incorporated by reference) to take into account NLE-induced spectral deformations by employing measurements performed at three or more wavelengths instead of two. The provided methods and devices are employed to determine the OSNR in presence of NLEs. Furthermore, NLE-induced spectral deformation itself also may be characterized.

There are provided methods and devices for determining a quality parameter characterizing an optical communication signal, the methods being performed by signal detection devices. At the transmitting end, there are obtained a signal power P1 of a first optical signal, a signal power P2 of a second optical signal, a signal power P3 of a third optical signal, optionally a signal power P4 of a fourth optical signal, and a total signal power Ps of a channel where the first, second, third and optional fourth optical signals are located. At a detection point, there are further obtained a signal power P1' of the first optical signal, a signal power P2' of the second optical signal, a signal power P3' of the third optical signal and optionally a signal power P4' of the fourth optical signal. There are then determined a signal deformation factor SDF and/or an optical signal to ASE noise ratio OSNR from the obtained signal powers.

In accordance with one aspect, there is provided a method for determining a quality parameter characterizing an optical communication signal, the method performed by a signal detection device and comprising: obtaining a signal power P1 of a first optical signal at a transmitter end, a signal power P2 of a second optical signal at a transmitter end, a signal power P3 of a third optical signal at a transmitter end, and a total signal power Ps of a channel where the first optical signal, the second optical signal and the third optical signal are located; obtaining a ratio K1 of the signal power P1 to the total signal power Ps and a ratio K2 of the signal power P2 to the signal power P1 and a ratio K3 of the signal power P3 to the signal power P1 according to P1, P2, P3 and Ps; obtaining a signal power P1' of the first optical signal at a detection point, a signal power P2' of the second optical signal at the detection point and a signal power P3' of the third optical signal at the detection point; obtaining a ratio K2' of the signal power P2' to the signal power P1' and a ratio K3' of the signal power P3' to the signal power P1' according to P1', P2' and P3'; determining an extended signal to noise ratio eOSNR2 according to the recorded ratios K1, K2 and K2' and an extended signal to noise ratio eOSNR3 according to the recorded ratios K1, K3 and K3'; and determining a signal deformation factor SDF from the extended signal to noise ratios eOSNR2 and eOSNR3.

In accordance with another aspect, there is provided a method for determining a quality parameter characterizing an optical communication signal, the method performed by a signal detection device and comprising: obtaining a signal power P1 of a first optical signal at a transmitter end, a signal power P2 of a second optical signal at the transmitter end, a signal power P3 of a third optical signal at the transmitter end, a signal power P4 of a fourth optical signal at the transmitter end and a total signal power Ps of a channel where the first optical signal, the second optical signal, the third optical signal and the fourth optical signal are located; obtaining a signal power P1' of the first optical signal at a detection point, a signal power P2' of the second optical signal at the detection point, a signal power P3' of the third optical signal at the detection point and a signal power P4' of the fourth optical signal at the detection point; and determining an Optical Signal to ASE Noise Ratio (OSNR) at least according to the obtained signal powers P1, P2, P3, P4, Ps, P1', P2', P3' and P4'.

In accordance with yet another aspect, there is provided a detection device for determining a quality parameter characterizing an optical communication signal, comprising: a recording unit, configured to record a ratio K2 of a signal power P2 of a second optical signal collected at a transmitting end to a signal power P1 of a first optical signal collected at the transmitting end, a ratio K3 of a signal power P3 of a third optical signal collected at the transmitting end to the signal power P1 and a ratio K1 of the signal power P1 and a total signal power Ps of a channel where the first optical signal, the second optical signal and the third optical signal are located; an optical filter unit, configured to filter a channel to be detected and obtain a signal power P1' of the first optical signal at a detection point, a signal power P2' of the second optical signal at the detection point and a signal power P3' of the third optical signal at the detection point; an opto-electrical conversion unit, configured to convert the signal power P1', the signal power P2' and the signal power P3' to respective electrical signals; a data collection unit, configured to obtain the signal power P1' of the first optical signal at the detection point, the signal power P2' of the second optical signal at the detection point and the signal power P3' of the third optical signal at the detection point after the optical signals are processed by the opto-electrical conversion unit, and calculate a ratio K2' of the signal power P2' to the signal power P1' and a ratio K3' of the signal power P3' to the signal power P1'; and a data processing unit, configured to determine an extended signal to noise ratio eOSNR2 according to the recorded ratios K1, K2 and K2' and an extended signal to noise ratio eOSNR3 according to the recorded ratios K1, K3 and K3', and calculate a signal deformation factor SDF from the extended signal to noise ratios eOSNR2 and eOSNR3.

In accordance with still another aspect, there is provided a detection device for determining a quality parameter characterizing an optical communication signal, comprising: a recording unit, configured to record a ratio K2 of a signal power P2 of a second optical signal collected at a transmitting end to a signal power P1 of a first optical signal collected at the transmitting end, a ratio K3 of a signal power P3 of a third optical signal collected at the transmitting end to the signal power P1, a ratio K4 of a signal power P4 of a fourth optical signal collected at the transmitting end to the signal power P1, and a ratio K1 of the signal power P1 and a total signal power Ps of a channel where the first optical signal, the second optical signal, the third optical signal and the fourth optical signal are located; an optical filter unit, configured to filter a channel to be detected and obtain a signal power P1' of the first optical signal at a detection point, a signal power P2' of the second optical signal at the detection point, a signal power P3' of the third optical signal at the detection point and a signal power P4' of the fourth optical signal at the detection point; an opto-electrical conversion unit, configured to convert the signal power P1', the signal power P2', the signal power P3' and the signal power P4' to respective electrical signals; a data collection unit, configured to obtain the signal power P1' of the first optical signal at the detection point, the signal power P2' of the second optical signal at the detection point, the signal power P3' of the third optical signal at the detection point and the signal power P4' of the fourth optical signal at the detection point after the optical signals are processed by the opto-electrical conversion unit, and calculate a ratio K2' of the signal power P2' to the signal power P1', a ratio K3' of the signal power P3' to the signal power P1' and a ratio K4' of the signal power P4' to the signal power P1'; and a data processing unit, configured to calculate an Optical Signal to ASE Noise Ratio (OSNR) at least according to the ratios K1, K2, K3, K4, K2', K3' and K4'.

BRIEF DESCRIPTION OF THE DRAWINGS

Further features and exemplary advantages of the present invention will become apparent to the skilled person from the following detailed description, taken in conjunction with the appended drawings, in which.

It will be noted that throughout the appended drawings, like features are identified by like reference numerals.

In the appended flow charts, boxes shown in dashed lines are used to denote steps or features that may be optional in some circumstances or for some embodiments.

It should also be understood that when the appended drawings are denoted as schematics, elements of the drawings are not necessarily drawn to scale. Some mechanical or other physical components may also be omitted in order to not unduly encumber the figures.

DESCRIPTION

The prior art method compares the signal level as filtered at two distinct wavelengths (within the optical channel bandwidth) at the transmitter end, to the same measured at the receiver end (or any other detection point) in order to determine the Optical Signal to ASE Noise Ratio (OSNR). Measurements are made at $\lambda 1$ (typically but not necessarily corresponding to the signal peak) and $\lambda 2$ (offset from the signal peak).

The method proposed herein applies all steps of the prior art method using measurements performed at two wavelengths, i.e. $\lambda 1$ and $\lambda 2$, to obtain a first "extended" signal to noise measurement (eOSNR2) equivalent to the OSNR measurement of LIU (U.S. Pat. No. 9,008,508) or a variation thereof. It then repeats the prior art method using measurements already performed at $\lambda 1$, and additional measurements performed at an additional wavelength $\lambda 3$ (within the optical channel bandwidth) to obtain a second "extended" signal to noise measurement (eOSNR3), calculated from measurements at $\lambda 1$ and $\lambda 3$. In absence of NLE-induced spectral deformation, an OSNR measurement performed using $\lambda 1$ and $\lambda 2$ should be equal to that performed using $\lambda 1$ and $\lambda 3$. However, because of NLE-induced spectral deformation, they are different.

Accordingly, a signal deformation factor (SDF) may be derived from the difference between the first and second "extended" signal to noise ratios eOSNR2, eOSNR3:

$$SDF = \frac{eOSNR3^{-1} - eOSNR2^{-1}}{\lambda_3 - \lambda_2} \quad (1.1)$$

This may be generalized to:

$$SDF = \left\langle \frac{deOSNR(\lambda)^{-1}}{d\lambda} \right\rangle \quad (1.2)$$

where the brackets $\langle f(\lambda) \rangle$ represent the average of $f(\lambda)$ taken over a set of measurements performed at variable wavelengths $\lambda$.

Figure 1:
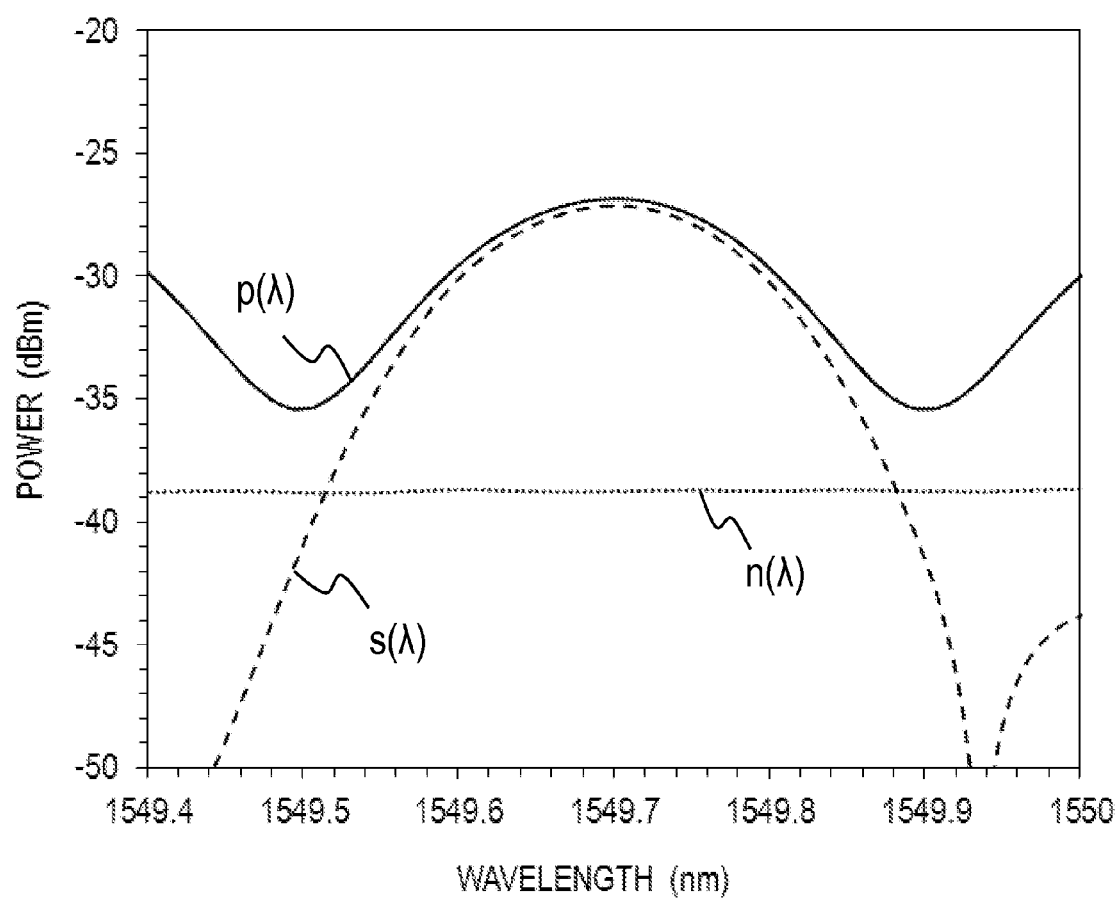
FIG. 1 is a graph illustrating the optical spectrum of an exemplary optical communication signal along with the optical spectrum of its noise contribution and of its signal contribution.

Now referring to FIG. 1, the methods and systems described herein relate to the characterization of an optical communication signal p which is used in optical telecommunications to transmit data over a Dense Wavelength Division Multiplexing (DWDM) optical channel. Throughout the present description, the optical signal p corresponds to one of the DWDM optical channels. Within the optical channel bandwidth of interest, the optical signal p includes two components, namely a signal contribution s arising from the data-carrying signal, and an ASE-noise contribution n that includes all other sources of optical power within the optical channel. In the case of polarization-multiplexed communication, the signal contribution includes two distinct components having mutually orthogonal states of polarization. The noise contribution n arises mostly from the Amplified Spontaneous Emission (ASE) noise of the optical amplifiers in the optical transmission system. FIG. 1 shows the optical spectrum $p(\lambda)$ of an exemplary optical communication signal p, along with the optical spectrum of its signal contribution $s(\lambda)$ and the optical spectrum of its noise contribution $n(\lambda)$, such that:

$$p(\lambda)=s(\lambda)+n(\lambda) \quad (1.3)$$

An optical spectrum trace of the optical communication signal p can be acquired by an Optical Spectrum Analyzer (OSA) and represents the input optical communication signal p convolved with the filter spectral response of the OSA $h_{OSA}(\lambda)$. The optical spectrum trace $P(\lambda)$ thus represents the spectrally-resolved optical power of the optical signal p. The optical spectrum trace $P(\lambda)$ also includes a signal contribution $S(\lambda)$ and a noise contribution $N(\lambda)$, which are merged together and appear as the optical spectrum trace $P(\lambda)$.

The optical spectrum of the optical communication signal p as would be acquired by an OSA corresponds to a convolution of the optical signal p with the filter spectral response $h_{OSA}(\lambda)$ of the OSA:

$$P(\lambda)=p(\lambda)*h_{OSA}(\lambda)=[s(\lambda)+n(\lambda)]*h_{OSA}(\lambda)=S(\lambda)+N(\lambda) \quad (1.4)$$

where * designates the convolution function.

Discrete acquisitions may also be performed on the optical signal p using optical filters, having a fixed central wavelength or a tunable central wavelength. An acquisition performed with an optical filter Fx having a central wavelength $\lambda x$ and filter spectral response $h_{Fx}(\lambda)$ corresponding to a bandwidth BWx corresponds to the integration over the optical spectrum of the optical signal p multiplied by the filter spectral response $h_{Fx}(\lambda)$ of the optical filter:

$$Px=\int p(\lambda) \cdot h_{Fx}(\lambda) d\lambda = \int (s(\lambda)+n(\lambda)) \cdot h_{Fx}(\lambda) d\lambda = Sx+Nx \quad (1.5)$$

where x designates a reference numeral corresponding to a given optical filter x, Sx is the signal contribution to the acquired power Px and Nx is the noise contribution to the acquired power Px.

In this specification, the optical communication signal at a transmission end will be referred to as p and the optical communication signal at a downstream detection point will be referred to as p'.

The total signal power of the optical communication signal p over the optical bandwidth corresponding to the wavelength-division multiplexed channel of the optical communication signal (denoted herein as CBW, for Channel BandWidth) may be measured by employing an optical filter having a central wavelength and bandwidth corresponding to that of the optical communication signal so that $$Ps=\int p(\lambda) \cdot h_{FS}(\lambda) d\lambda \cong \int_{CBW} p(\lambda) d\lambda \quad (1.6)$$

where CBW is the Channel BandWidth, and Ps the total signal power of the optical communication signal.

The Two-Wavelength Approach

The two-wavelength approach as described in LIU (see U.S. Pat. No. 9,008,508) employs signal power measurements performed at two wavelengths to measure the OSNR on an optical communication signal p.

The two-wavelength approach is based on the following assumptions:

1. The ASE noise is approximately constant in wavelength within the optical channel bandwidth of the optical communication signal, or at least over the spectral range over which the signal power measurements are performed (i.e. the spectral range of the optical filters);
2. The bandwidth of the optical filter is smaller than the optical signal bandwidth. This condition frequently holds for systems with a rate of 40 Gbit/s or higher; and
3. The signal spectrum does not deform during transmission.

Figure 2:
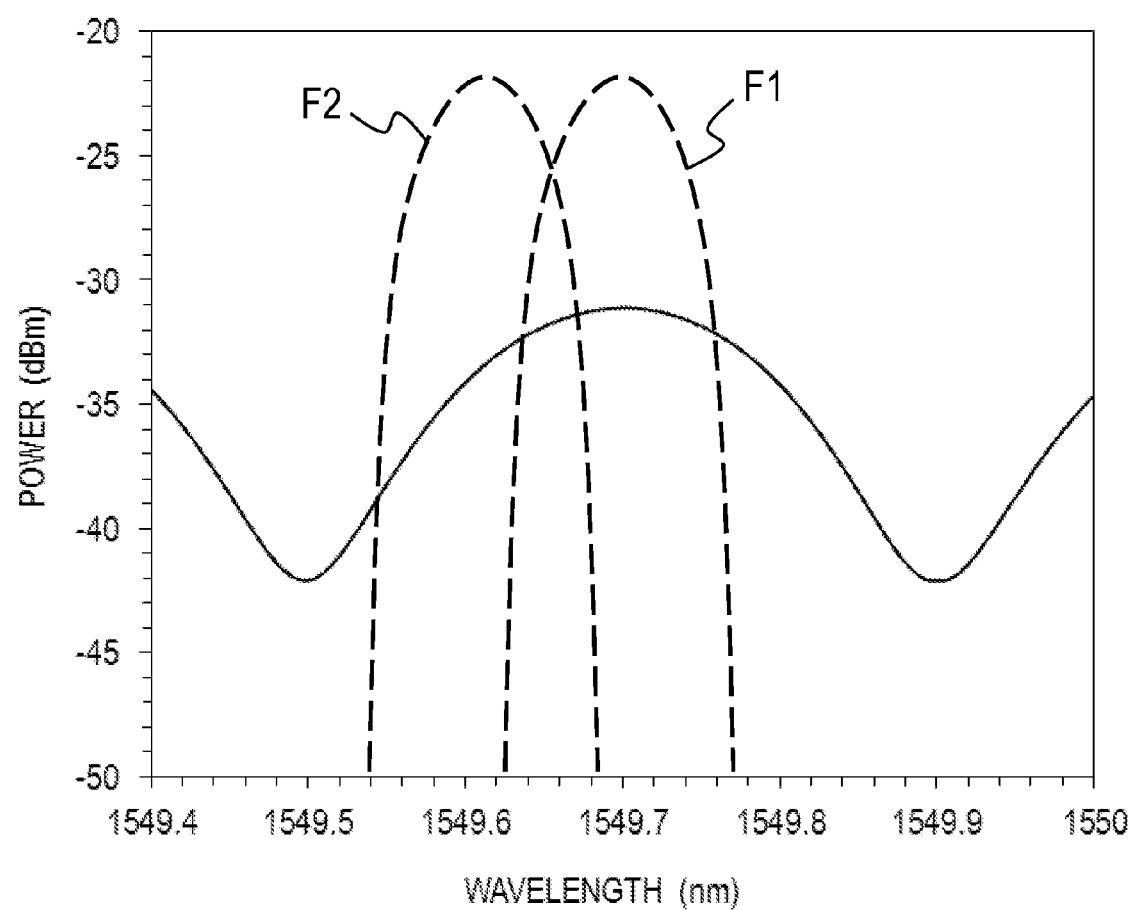
FIG. 2 is a graph illustrating the two-wavelength approach and its corresponding optical filters F1, F2 on the optical spectrum of an exemplary optical communication signal at the transmission end, in accordance with one embodiment.

FIG. 2 illustrates the signal spectrum detection at the transmission end. Two filters F1, F2 that have different central wavelengths and same bandwidth and which have bandwidths smaller than the optical signal bandwidth are used. F2 is at the edge of the optical channel bandwidth and F1 is at the center of the optical channel bandwidth.

The signal power P1 of a first optical signal at the transmitter end (i.e. before ASE noise is introduce on the optical communication signal), is obtained using optical filter F1 centered on λ1. The signal power P2 of a second optical signal at a transmitter end is obtained using optical filter F2 centered on λ2. Also obtained is the total signal power Ps of the optical communication signal over the channel bandwidth CBW where the first optical signal and the second optical signal are located. The signal powers at F1 and F2 are different because the power spectral density of the optical communication signal is not uniform over the channel bandwidth.

Based on these signal powers, the following power ratios are calculated:

$$K1 = P1/Ps \quad (1.7a)$$

$$K2 = P2/P1 \quad (1.7b)$$

The signal power spectrum information, i.e. K1 and K2, can be recorded on the detection device onsite or on the network management system (NMS).

At the detection point, where of the ASE noise introduced during line transmission, the same or equivalent optical filters F1 and F2 are employed for optical power detection. The detected power comprises a signal contribution and a noise contribution as shown in FIG. 1.

The signal power P1' of the first optical signal and the signal power P2' of the second optical signal are obtained at the detection point.

Based on these signal powers, the following power ratio is calculated:

$$K2' = P2'/P1' \quad (1.7c)$$

Because there is no ASE noise at the transmitter end, the ratio K2 also corresponds to the ratio of the signal contribution in P2 to the signal contribution in P1:

$$K2 = S2/S1 \quad (1.8)$$

where S1 and S2 are respective signal contributions in P1 and P2.

In absence of NLE-induced spectral deformation, the ratio K2 obtained at the transmitter end will also be equal to the ratio of the signal contribution in P2' to the signal contribution in P1':

$$K2' = S2'/S1' \quad (1.9)$$

where S1' and S2' are respective signal contributions in P1' and P2'.

It will now be shown that the OSNR may be defined as:

$$OSNR = C \cdot \frac{1 - K2'}{K2' - S2'/S1'} \quad (1.10a)$$

where $$C = \frac{B_{F1}}{B_r \cdot K1} \quad (1.10b)$$

where $B_{F1}$ represents the optical bandwidth of the optical filter F1 from which the first optical signal is obtained and where $B_r$ is the reference optical bandwidth, typically chosen to be 0.1 nm. The optical bandwidth of the optical filter F1 may be assumed to be predetermined since, the bandwidth may be specified or measured when obtaining filter F1.

Knowing that $$K2' = \frac{P2'}{P1'} = \frac{S2' + N2'}{S1' + N1'} \quad (1.11)$$

Under the assumption that the ASE noise level is approximately constant in wavelength over the optical signal bandwidth, i.e. N1'=N2', we find:

$$K2' = \frac{S2' + N1'}{S1' + N1'} = \frac{S2'/S1' + N1'/S1'}{1 + N1'/S1'} \quad (1.12)$$

By rewriting equation (1.12) we find:

$$\frac{S1'}{N1'} = \frac{1 - P2'/P1'}{P2'/P1' - S2'/S1'} = \frac{1 - K2'}{K2' - S2'/S1'} \quad (1.13)$$

and $$OSNR = C \cdot \frac{S1'}{N1'} = C \cdot \frac{1 - K2'}{K2' - S2'/S1'} \quad (1.14)$$

As explained hereinbefore, in absence of NLE-induced spectral deformation, the ratio K2=P2/P1=S2/S1 obtained at the transmitter end is also equal to the ratio S2'/S1' of the signal contribution in P2' to the signal contribution in P1', such that K2=S2'/S1'. From equation (1.14) and assuming the NLE-induced spectral deformation can be neglected, the OSNR may be calculated from the above measurements as follows:

$$OSNR = C \cdot \frac{1 - K2'}{K2' - K2} \quad (1.15)$$

The Three-Wavelength Approach

In cases where NLE-induced spectral deformation cannot be neglected, e.g. K2≠S2'/S1', the OSNR cannot be calculated directly from equation (1.15). In this case, an approach employing measurements made at three or more wavelengths may be employed.

The three-wavelength approach is based on the following assumptions:

1. The ASE noise is approximately constant in wavelength within the optical channel bandwidth of the optical communication signal, or at least over the spectral range over which the signal power measurements are performed (i.e. the spectral range of the optical filters); and 2. The bandwidth of the optical filter is smaller than the optical signal bandwidth. This condition frequently holds for systems with a rate of 40 Gbit/s or higher.

The calculation of equation (1.15) may still be employed to define what will be referred to herein as an "extended" signal to noise ratio eOSNRx:

$$eOSNRx = \frac{B_{F1}}{B_r \cdot K1} \cdot \frac{1 - Kx'}{Kx' - Kx} \quad (2.1a)$$

$$eOSNRx = C \cdot \frac{1 - Kx'}{Kx' - Kx} \quad (2.1b)$$

where x designates a reference numeral corresponding to a given optical filter x centered on λx and where C is defined hereinbefore at equation (1.10b).

However, in case of non-negligible NLE-induced spectral deformation, the extended optical signal to noise ratio eOSNRx varies as a function of the respective central wavelengths of the optical filters F1, F2 employed for the measurement and, as such, does not accurately represent the OSNR. In this case, a measurement performed at a third wavelength may be employed to derive the OSNR and the NLE-induced spectral deformation.

Figure 3:
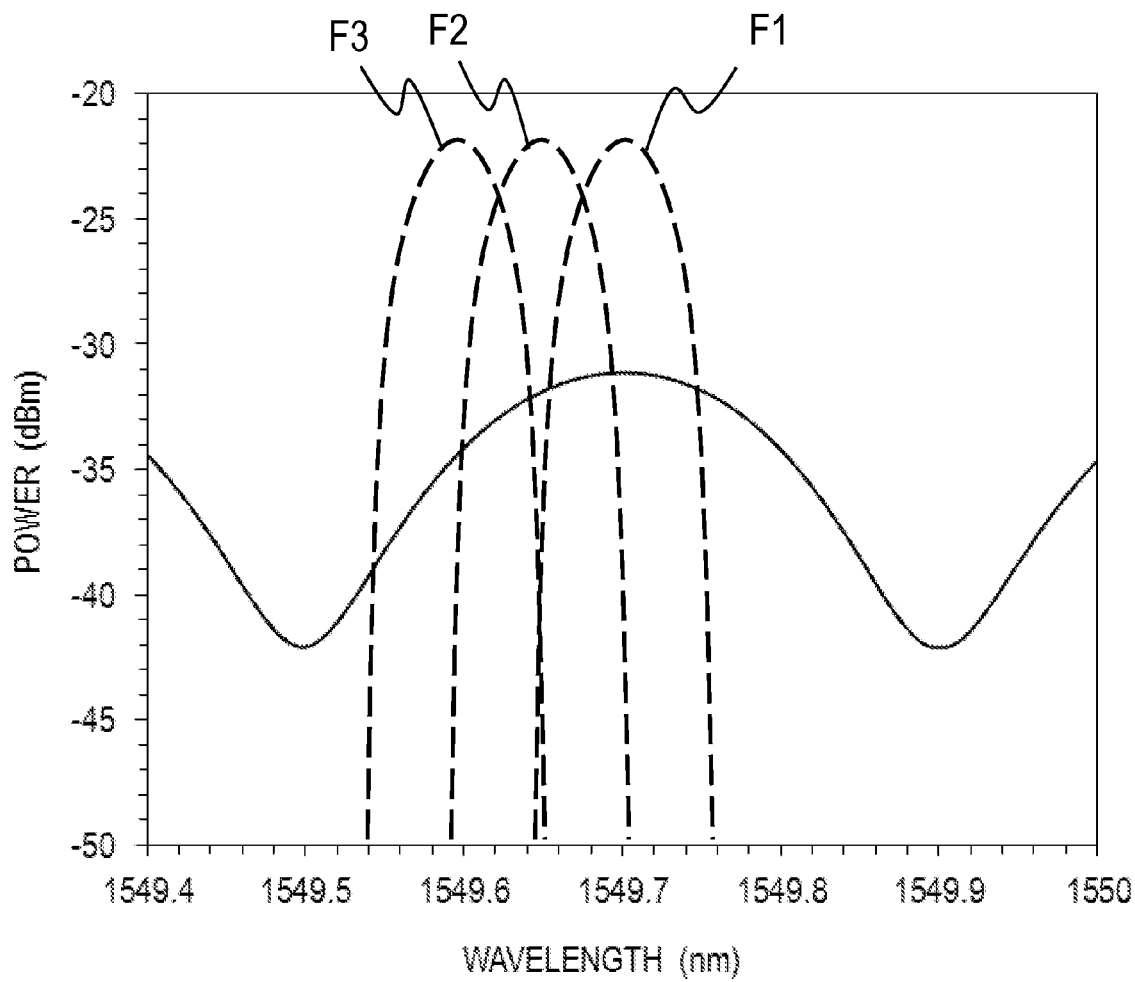
FIG. 3 is a graph illustrating the three-wavelength approach and its corresponding optical filters F1, F2, F3 on the optical spectrum of an exemplary optical communication signal at the transmission end, in accordance with one embodiment.

In addition to the signal powers P1 and P2 obtained in the two-wavelength approach, a third signal power P3 of a third optical signal at the transmitter end is obtained using optical filter F3 centered on λ3. FIG. 3 illustrates the signal spectrum detection at the transmitting end along with the optical filters F1, F2 and F3. The three filters F1, F2, F3 have different central wavelengths and have the same bandwidth which is smaller than the optical signal bandwidth. In this embodiment, F1 is at the center of the optical channel bandwidth, and F2 and F3 are offset toward the same side relative to the center of the optical channel bandwidth.

In addition to the ratios defined according to equation (1.7), the following power ratios may then be obtained:

$$K3 = P3/P1 \quad (2.2a)$$

Figure 4:
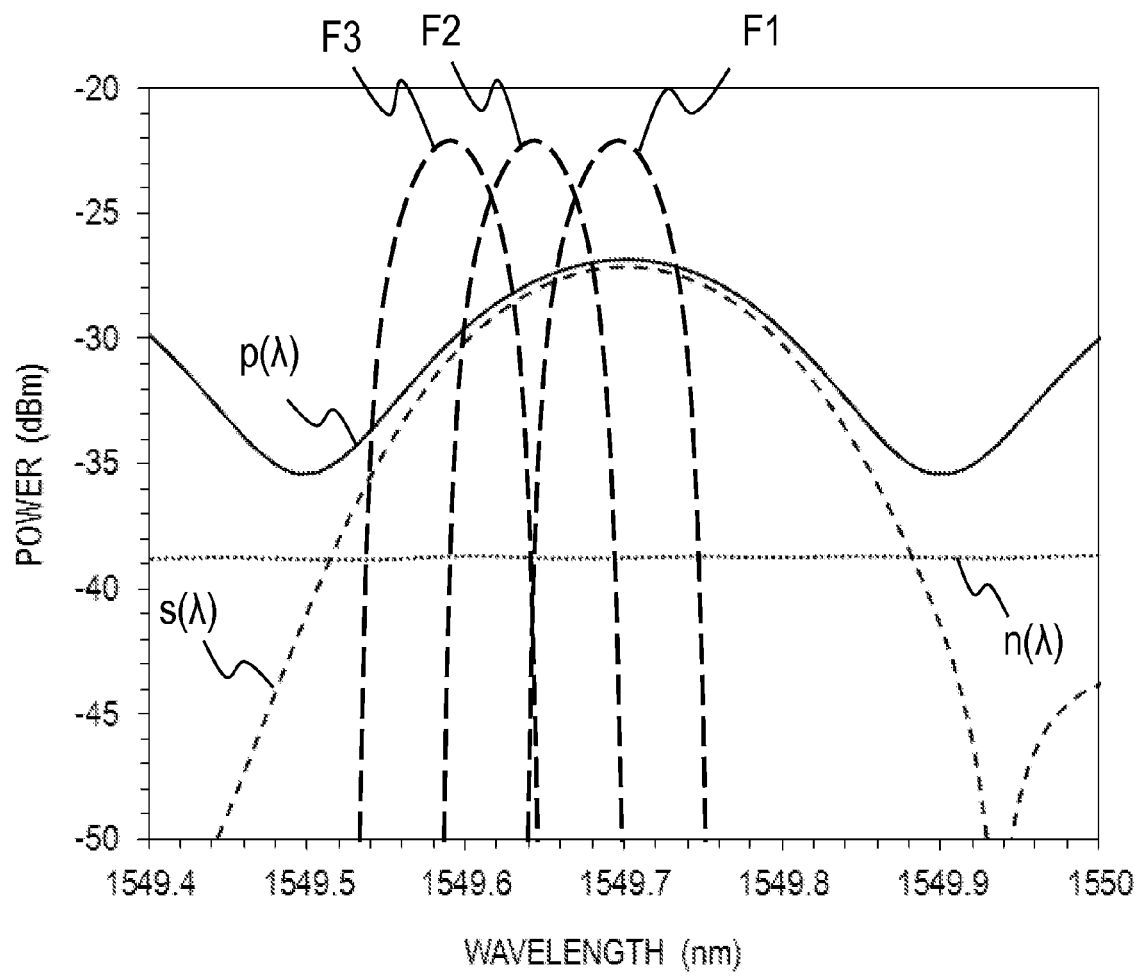
FIG. 4 is a graph illustrating the three-wavelength approach and its corresponding optical filters F1, F2, F3 on the optical spectrum of an exemplary optical communication signal at the detection point, in accordance with one embodiment.

At the detection point, the same or an equivalent optical filter F3 is employed for optical power detection. In addition to the signal powers P1' and P2', the signal power P3' of the third optical signal at the detection point is obtained. FIG. 4 illustrates the signal spectrum detection at the detection point along with the optical filters F1, F2 and F3.

Based on the obtained signal powers, the following power ratio is calculated:

$$K3' = P3'/P1' \quad (2.2b)$$

Because of NLE-induced spectral deformation, measurements performed with optical filters centered on varying wavelengths will result in different extended optical signal to noise ratios eOSNRx such that $$eOSNR2 = C \cdot \frac{1 - K2'}{K2' - K2} \neq \quad (2.3a)$$

$$eOSNR3 = C \cdot \frac{1 - K3'}{K3' - K3} \quad (2.3b)$$

It was shown hereinbefore that the OSNR may be calculated according to equation (1.14) above:

$$OSNR = C \cdot \frac{1 - K2'}{K2' - S2'/S1'} \quad (1.14)$$

Defining:

$$\Delta K2 = K2 - S2'/S1' \quad (2.4)$$

by rewriting equation (1.18a), we find:

$$eOSNR2^{-1} = \frac{1}{C} \cdot \frac{K2' - K2}{1 - K2'} = \frac{1}{C} \cdot \frac{K2' - (S2'/S1' + \Delta K2)}{1 - K2'} \quad (2.5a)$$

$$eOSNR2^{-1} = OSNR^{-1} - \frac{1}{C} \cdot \frac{\Delta K2}{1 - K2'} \quad (2.5b)$$

or $$eOSNR2^{-1} = OSNR^{-1} - SD2 \quad (2.5c)$$

where $$SDx = \frac{1}{C} \cdot \frac{\Delta Kx}{1 - Kx'} \quad (2.6)$$

Assuming that signal deformation is only caused by NLEs, SDx is a measure of the NLE-induced signal deformation contribution at λx. It should be noted that in absence of signal deformation, eOSNRx$^{-1}$ would be constant as a function of wavelength.

Defining a Signal Deformation Factor SDF as $$SDF = \frac{eOSNR3^{-1} - eOSNR2^{-1}}{\lambda 3 - \lambda 2} \quad (2.7)$$

The average signal deformation contribution can be estimated by $$SD = \frac{SD3 + SD2}{2} = \alpha(SDF) \quad (2.8)$$

where α( ) is a function, normally a polynomial fit, that can be empirically derived from the determined relationship between SD and SDF. This function can be calibrated at least for a given set of links and system parameters which can typically include a range of modulation formats/rates system configurations (and is therefore not dependent on the specifics of the system and signal under test within the given set). It can be shown that this relationship holds even when nonlinearities are strong.

The ASE OSNR can then be obtained as:

$$OSNR^{-1} = \frac{eOSNR3^{-1} + eOSNR2^{-1}}{2} - SD \quad (2.9)$$

Acquisitions at a minimum of three wavelengths ($\lambda_1$, $\lambda_2$, and $\lambda_3$) are therefore required in order to account for NLE-induced deformations.

Figure 5:
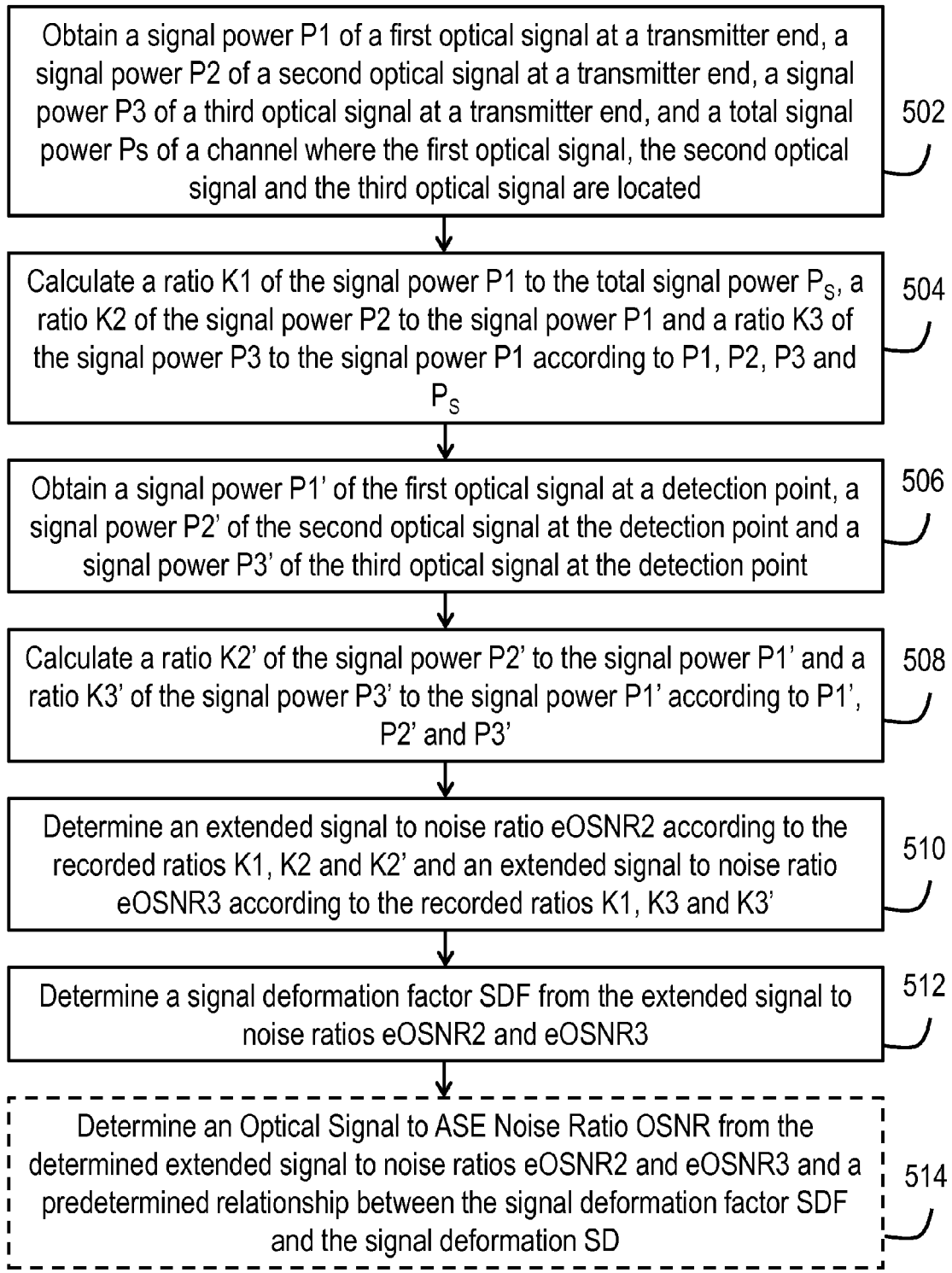
FIG. 5 is a flow chart illustrating a method of determining a quality parameter characterizing the optical communication signal according to the three-wavelength approach, in accordance with one embodiment.

FIG. 5 illustrates a method 500 of determining the signal deformation factor SDF and/or the in-band OSNR according to the three-wavelength approach and in accordance with one embodiment.

In step 502, there are obtained and recorded a signal power P1 of a first optical signal at a transmitting end, a signal power P2 of a second optical signal at the transmitting end, a signal power P3 of a third optical signal at a transmitter end, and a total signal power Ps of a channel where the first optical signal, the second optical signal and the third optical signal are located.

The first optical signal, the second optical signal and the third optical signal are different in central wavelength but same in bandwidth.

Further, the first optical signal is at a central wavelength of an optical channel bandwidth of said optical communication signal, and the second optical signal and the third optical signal are offset toward the same side relative to the center of the optical channel bandwidth.

In step 504, there are obtained and recorded a ratio K1 of the signal power P1 to the total signal power Ps, a ratio K2 of the signal power P2 to the signal power P1 and a ratio K3 of the signal power P3 to the signal power P1 according to P1, P2, P3 and Ps obtained in step 502.

Obtaining and recording the ratio K1 of P1 to Ps, the ratio K2 of P2 to P1 and the ratio K3 of P3 to P1 in step 504 may comprise recording the ratio K1, the ratio K2 and the ratio K3 on site or on a network management information and storing the same in the OSNR detection device at the detection point.

In step 506, there are obtained a signal power P1' of the first optical signal at a detection point, a signal power P2' of the second optical signal at the detection point and a signal power P3' of the third optical signal at the detection point.

In step 508, there are calculated a ratio K2' of the signal power P2' to the signal power P1' and a ratio K3' of the signal power P3' to the signal power P1' according to P1', P2' and P3'.

In step 510, there are determined an extended signal to noise ratio eOSNR2 according to the recorded ratios K1, K2 and K2' and an extended signal to noise ratio eOSNR3 according to the recorded ratios K1, K3 and K3'.

More specifically, the extended signal to noise ratio eOSNR2 is obtained using a formula at least equivalent to equation (2.3a) and the extended signal to noise ratio eOSNR3 is obtained using a formula at least equivalent to equation (2.3b).

In step 512, there are determined a signal deformation factor SDF from the extended signal to noise ratios eOSNR2 and eOSNR3.

In step 514, there are optionally determined an OSNR from the determined extended signal to noise ratios eOSNR2 and eOSNR3 and a predetermined relationship between the signal deformation factor SDF and the signal deformation SD.

More specifically, the OSNR is obtained using a formula at least equivalent to equation (2.9).

The Four-Wavelength Approach:

The four-wavelength approach is also based on the following assumptions:

1. The ASE noise is approximately constant in wavelength within the optical channel bandwidth of the optical communication signal, or at least over the spectral range over which the signal power measurements are performed (i.e. the spectral range of the optical filters); and 2. The bandwidth of the optical filter is smaller than the optical signal bandwidth. This condition frequently holds for systems with a rate of 40 Gbit/s or higher.

The four-wavelength approach assumes a first signal power measurement P1 obtained using a first optical filter F1 centered on $\lambda 1$. All other signal powers and ratios are now defined as functions dependent on the central wavelength $\lambda x$ of the optical filter Fx, where at least three signal powers are obtained in addition to signal power P1, using at least three respective other optical filters Fx. Accordingly, in addition to signal powers P1, P2 and P3 obtained in the three-wavelength approach, a fourth signal power P4 of a fourth optical signal is obtained at the transmitter end using an optical filter F4 centered on $\lambda 4$ and signal powers P2, P3 and P4 are now referred to as $P(\lambda)$. Similarly, a fourth signal power P4' of the fourth optical signal is also obtained at the detection point using an optical filter F4 and signal powers P2', P3' and P4' are now referred to as $P'(\lambda)$.

Figure 6:
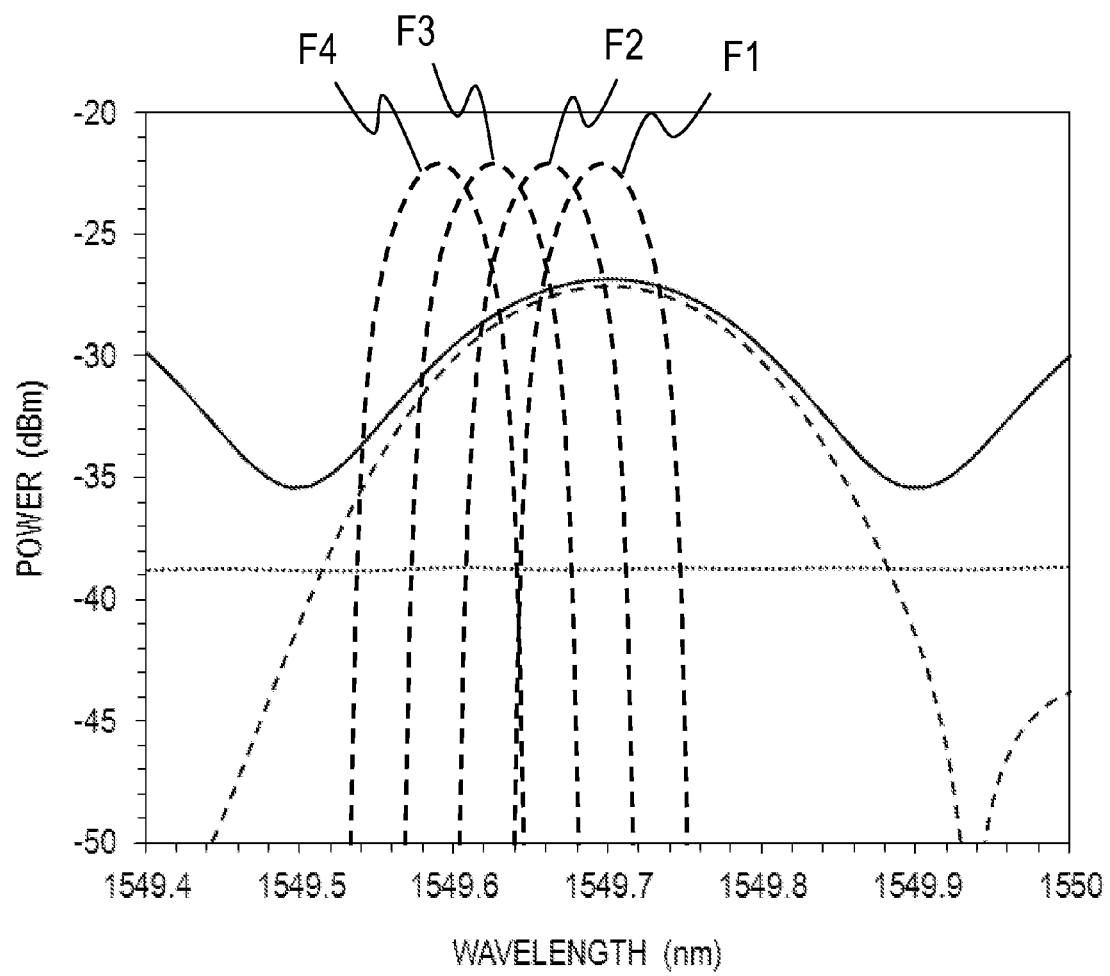
FIG. 6 is a graph illustrating the four-wavelength approach and its corresponding optical filters F1, F2, F3, F4 on the optical spectrum of an exemplary optical communication signal at the detection point, in accordance with one embodiment.

FIG. 6 illustrates the signal spectrum detection at the detection point along with the optical filters F1, F2, F3 and F4.

The following ratios may then be defined:

$$K(\lambda)=P(\lambda)/P1 \qquad (3.1a)$$

$$K'(\lambda)=P'(\lambda)/P1' \qquad (3.1b)$$

where each obtained $P'(\lambda)$ comprise a signal contribution $S'(\lambda)$ and a noise contribution $N'(\lambda)$, such that:

$$P'(\lambda)=S'(\lambda)+N'(\lambda) \qquad (3.2)$$

Accordingly, we have:

$$K'(\lambda) = \frac{P'(\lambda)}{P1'} = \frac{S'(\lambda)+N'(\lambda)}{S1'+N1'} \qquad (3.3)$$

Under the assumption that ASE noise level is approximately constant in wavelength over the optical channel bandwidth, i.e. $N'(\lambda)=N1'$, we find:

$$K'(\lambda) = \frac{S'(\lambda)+N1'}{S1'+N1'} = \frac{S'(\lambda)/S1'+N1'/S1'}{1+N1'/S1'} \qquad (3.4)$$

Similarly to equation (2.4), defining:

$$\Delta K(\lambda)=K(\lambda)-S'(\lambda)/S1' \qquad (3.5)$$

by rewriting equation (3.4), we find:

$$K'(\lambda) = \frac{K(\lambda)-\Delta K(\lambda)+N1'/S1'}{1+N1'/S1'} \qquad (3.6)$$

From the second derivative of $K'(\lambda)$, we find:

$$\frac{d^2 K'(\lambda)}{d\lambda^2} = \frac{1}{1+N1'/S1'} \cdot \left(\frac{d^2 K(\lambda)}{d\lambda^2} - \frac{d^2 \Delta K(\lambda)}{d\lambda^2}\right) \qquad (3.7)$$

where the second term including the second derivative of $\Delta K(\lambda)$ can typically be neglected such that we have:

$$\frac{N1'}{S1'} = \frac{\frac{d^2 K(\lambda)}{d\lambda^2}}{\frac{d^2 K'(\lambda)}{d\lambda^2}} - 1 \qquad (3.8)$$

and therefore:

$$OSNR = C \cdot \frac{\frac{d^2 K'(\lambda)}{d\lambda^2}}{\frac{d^2 K(\lambda)}{d\lambda^2} - \frac{d^2 K'(\lambda)}{d\lambda^2}} \quad (3.9)$$

The second-order derivation operation can be carried out by performing measurements at a minimum of four wavelengths to obtain P1, P2, P3, P4, P2', P3' and P4' and K2, K3, K4=P4/P1, K2', K3' and K4'=P4'/P1':

$$\frac{d^2 K(\lambda)}{d\lambda^2} = \frac{P4 - 2P3 + P2}{P1 \cdot \Delta\lambda^2} = \frac{K4 - 2K3 + K2}{\Delta\lambda^2} \quad (3.10a)$$

$$\frac{d^2 K'(\lambda)}{d\lambda^2} = \frac{P4' - 2P3' + P2'}{P1' \cdot \Delta\lambda^2} = \frac{K4' - 2K3' + K2'}{\Delta\lambda^2} \quad (3.10b)$$

where $\Delta\lambda$ is the spacing between the central wavelengths of optical filters F2, F3, F4, assuming that the central wavelengths are equidistant such that $\Delta\lambda = \lambda 4 - \lambda 3 = \lambda 3 - \lambda 2$ (although it is not necessary for the central wavelengths to be equidistant, the OSNR calculation is simplified if they are). Accordingly, $$OSNR = C \cdot \frac{1}{\frac{K4 - 2K3 + K2}{K4' - 2K3' + K2'} - 1} \quad (3.11a)$$

$$OSNR = C \cdot \frac{K4' - 2K3' + K2'}{K4 - 2K3 + K2 - (K4' - 2K3' + K2')} \quad (3.11b)$$

Furthermore, as per equation (2.9) derived in the three-wavelength approach, by defining the extended signal to noise ratio as:

$$eOSNR(\lambda) = C \cdot \frac{1 - K'(\lambda)}{K'(\lambda) - K(\lambda)}, \quad (3.12)$$

the signal deformation SD can also be found from the average of the extended signal to noise ratio over the set of measurements and the determined OSNR:

$$SD = \langle eOSNR^{-1}(\lambda) \rangle - OSNR^{-1} \quad (3.13a)$$

$$SD = \frac{eOSNR2^{-1} + eOSNR3^{-1} + eOSNR4^{-1}}{3} - OSNR^{-1} \quad (3.13b)$$

where the brackets $\langle f(\lambda) \rangle$ represent the average of $f(\lambda)$ taken over a set of measurements performed at variable wavelengths $\lambda$.

Figure 7:
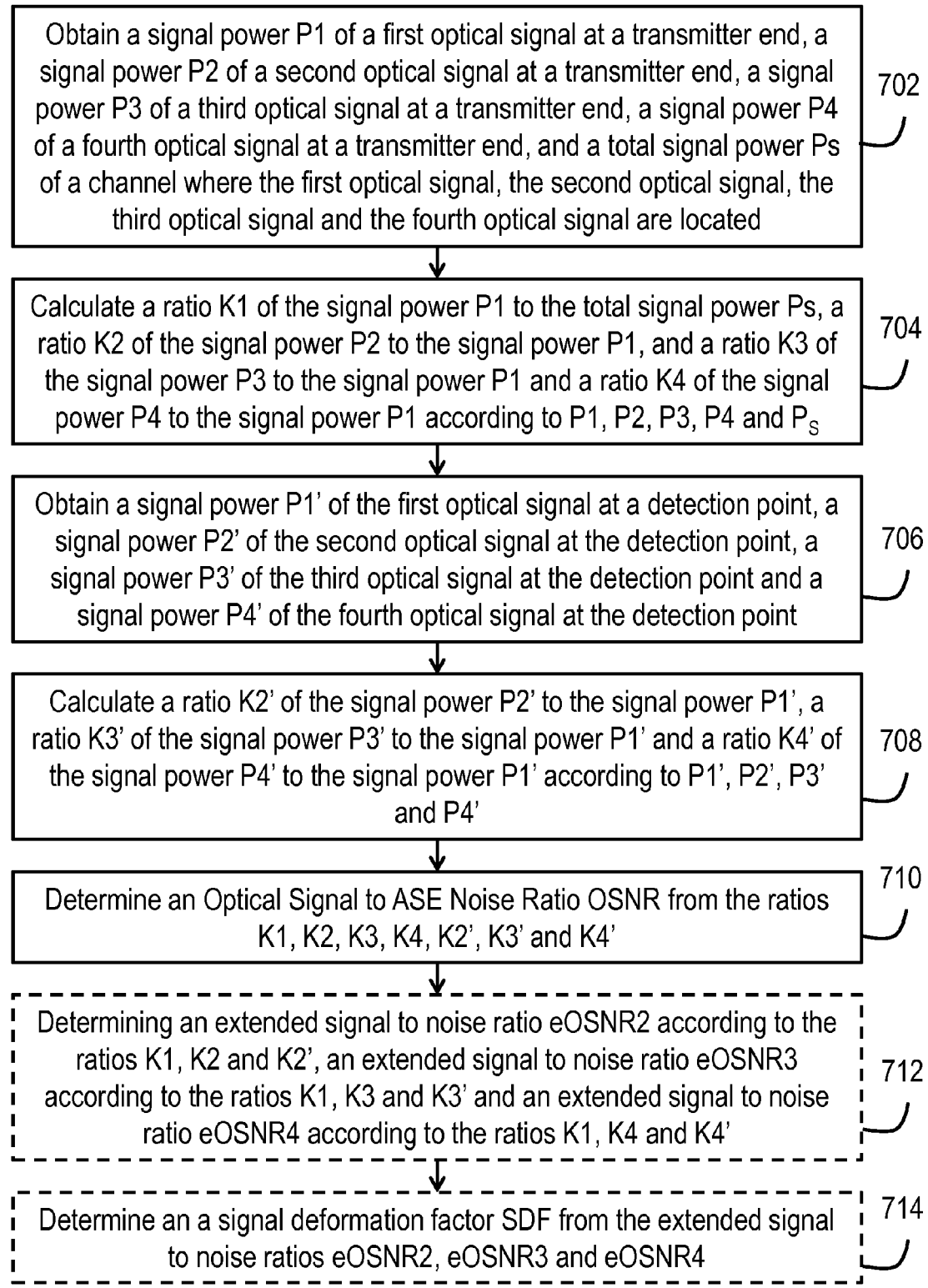
FIG. 7 is a flow chart illustrating a method of determining a quality parameter characterizing the optical communication signal according to the four-wavelength approach, in accordance with one embodiment.

FIG. 7 illustrates a method 700 of determining the signal deformation factor SDF and/or the in-band OSNR according to the three-wavelength approach and in accordance with one embodiment.

In step 702, there are obtained a signal power of a first optical signal at a transmitting end, a signal power P2 of a second optical signal at the transmitting end, a signal power P3 of a third optical signal at a transmitter end, a signal power P4 of a fourth optical signal at a transmitter end, and a total signal power Ps of a channel where the first optical signal, the second optical signal and the third optical signal are located.

The first optical signal, the second optical signal, the third optical signal and the fourth optical signal are different in central wavelength but same in bandwidth.

Furthermore, the first optical signal is at a central wavelength of an optical channel bandwidth and the second optical signal, the third optical signal and the fourth optical signal are obtain using respective optical filters having equidistant central wavelengths.

In step 704, there are obtained and recorded a ratio K1 of the signal power P1 to the total signal power Ps, a ratio K2 of the signal power P2 to the signal power P1, a ratio K3 of the signal power P3 to the signal power P1 and a ratio K4 of the signal power P4 to the signal power P1 according to P1, P2, P3, P4 and Ps obtained in step 702.

Obtaining and recording the ratio K1 of P1 to Ps, the ratio K2 of P2 to P1, the ratio K3 of P3 to P1 and the ratio K4 of P4 to P1 in step 704 may comprise recording the ratio K1, the ratio K2, the ratio K3 and the ratio K4 on site or on a network management information and storing the same in the OSNR detection device at the detection point.

In step 706, there are obtained a signal power P1' of the first optical signal at a detection point, a signal power P2' of the second optical signal at the detection point, a signal power P3' of the third optical signal at the detection point and a signal power P4' of the fourth optical signal at the detection point.

In step 708, there are calculated a ratio K2' of the signal power P2' to the signal power P1', a ratio K3' of the signal power P3' to the signal power P1' and a ratio K4' of the signal power P4' to the signal power P1' according to P1', P2', P3' and P4'.

In step 710, there is determined an OSNR according to the recorded ratios K1, K2, K3, K4, K2', K3' and K4'.

More specifically, the OSNR is obtained using a formula at least equivalent to equation (3.11a) or (3.11b).

In step 712, there are optionally determined an extended signal to noise ratio eOSNR2 according to the ratios K1, K2 and K2', an extended signal to noise ratio eOSNR3 according to the ratios K1, K3 and K3' and an extended signal to noise ratio eOSNR4 according to the ratios K1, K4 and K4'.

In step 714, there are optionally determined a signal deformation from the extended signal to noise ratios eOSNR2, eOSNR3 and eOSNR4.

More specifically, the signal deformation is obtained using a formula at least equivalent to equation (3.13b).

Figure 8:
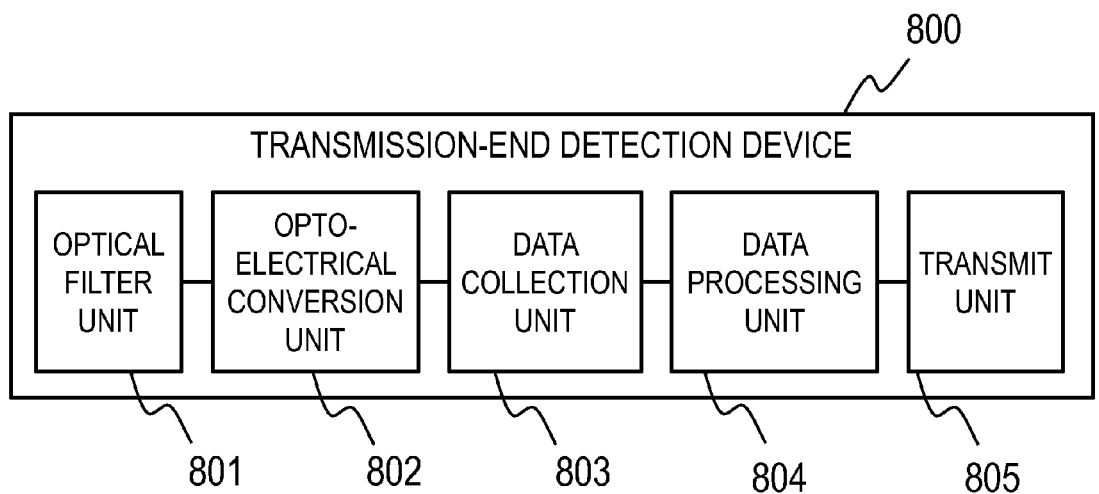
FIG. 8 is a block diagram illustrating a transmission-end detection device for conducting the method of FIG. 5 or FIG. 7, in accordance with one embodiment.

FIG. 8 shows a transmission-end detection device 800 in accordance with one embodiment. The detection device 800 includes:

an optical filter unit 801, configured to filter the optical channel to be detected and obtain the first optical signal, the second optical signal, the third optical signal and optionally the fourth optical signal of different central wavelengths at the transmitting end;

an opto-electrical conversion unit 802, configured to convert optical signals to electrical signals;

a data collection unit 803, configured to obtain the power P1 of the first optical signal, the power P2 of the second optical signal, the power P3 of the third optical signal, optionally, the power P4 of the fourth optical signal and the total power Ps of the channel where the first optical signal, the second optical signal, the third optical signal and optionally the fourth optical signal are located at the transmitting end after the optical signals are processed by the opto-electrical conversion unit 802;

a data processing unit 804, configured to calculate the ratio K1 of P1 to Ps, the ratio K2 of P2 to Ps, the ratio K3 of P3 to Ps and optionally the ratio K4 of P4 to P1 according to P1, P2, P3, P4 and Ps; and a transmission unit 805, configured to transmit the ratios K1, K2, K3 and optionally K4 to the detection device at the detection point.

In detail, the optical filter unit 801 may comprises a plurality of fixed optical filters or a tunable optical filter. The functions of the optical filter unit 801, the opto-electrical unit 802, and the data collection unit 803 may also all be implemented using an optical spectrum analyzer.

In addition, the first optical signal, the second optical signal, the third optical signal and the fourth optical signal are optical signals that have different central wavelengths and same bandwidth. If the detection device 800 is employed to according to the three-wavelength approach, the first optical signal may be at the center of the optical channel bandwidth, and the second optical signal and the third optical signal may be offset toward the same side relative to the center of the optical channel bandwidth. If the detection device 800 is employed to according to the fourth-wavelength approach, the second optical signal, the third optical signal and the fourth optical signal have equidistantly spaced central wavelengths and substantially equal optical bandwidths and the first optical signal may be at the center of the optical channel bandwidth, whereas the second optical signal, the third optical signal and the fourth optical signal may be offset toward the same side relative to the center of the optical channel bandwidth.

Figure 9:
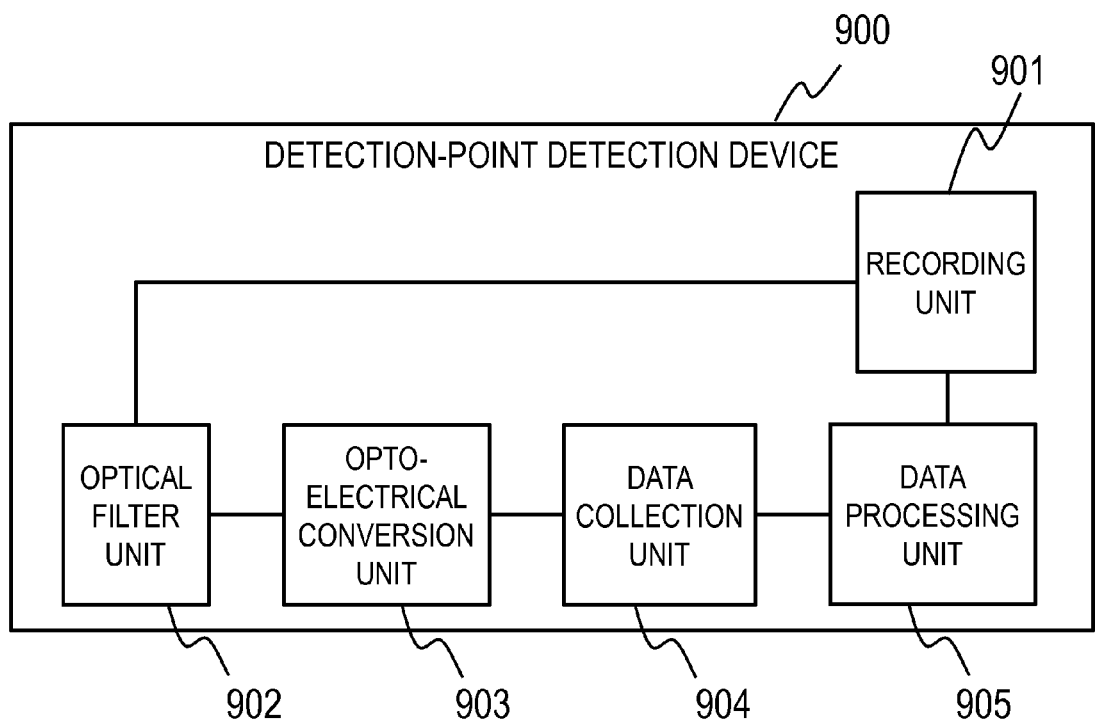
FIG. 9 is a block diagram illustrating a detection-point detection device for conducting the method of FIG. 5 or FIG. 7, in accordance with one embodiment.

FIG. 9 shows a detection-point detection device 900 in accordance with one embodiment. The detection device 900 includes:

a recording unit 901 configured to record the ratio K2 of the signal power P2 of the second optical signal collected at a transmitting end to a signal power P1 of the first optical signal collected at the transmitting end, the ratio K3 of the signal power P3 of the third optical signal collected at the transmitting end to the signal power P1, optionally the ratio K4 of the signal power P4 of the fourth optical signal collected at the transmitting end to the signal power P1, and the ratio K1 of the signal power P1 to the total signal power Ps of a channel where the first optical signal, the second optical signal, the third optical signal and optionally the fourth optical signal are located;

an optical filter unit 902, configured to filter a channel to be detected and obtain a signal power P1' of the first optical signal at a detection point, a signal power P2' of the second optical signal at the detection point, a signal power P3' of the third optical signal at the detection point and optionally a signal power P4' of the fourth optical signal at the detection point;

an opto-electrical conversion unit 903, configured to convert the signal power P1', the signal power P2', the signal power P3' and optionally the signal power P4' to respective electrical signals;

a data collection unit 904, configured to obtain the signal power P1' of the first optical signal at the detection point, the signal power P2' of the second optical signal at the detection point, the signal power P3' of the third optical signal and optionally the signal power P4' of the fourth optical signal at the detection point after the optical signals are processed by the opto-electrical conversion unit 903, and calculate a ratio K2' of the signal power P2' to the signal power P1', a ratio K3' of the signal power P3' to the signal power P1 and optionally a ratio K4' of the signal power P4' to the signal power P1; and a data processing unit 905, configured in the case of the three-wavelength approach to determine an extended signal to noise ratio eOSNR2 according to the recorded ratios K1, K2 and K2' and an extended signal to noise ratio eOSNR3 according to the recorded ratios K1, K3 and K3', and calculate a signal deformation factor SDF from the extended signal to noise ratios eOSNR2 and eOSNR3.

More specifically, the extended signal to noise ratio eOSNR2 is obtained using a formula at least equivalent to equation (2.3a) and the extended signal to noise ratio eOSNR3 is obtained using a formula at least equivalent to equation (2.3b).

Optionally, the data processing unit 905 may be further configured to calculate an OSNR from the calculated extended signal to noise ratio eOSNR2 and eOSNR3 and a predetermined relationship between the signal deformation factor SDF and the signal deformation SD.

More specifically, the OSNR is obtained using a formula at least equivalent to equation (2.9).

Or in the case of the four-wavelength approach, the data processing unit 905 is configured to calculate an OSNR at least according to the ratios K1, K2, K3, K4, K2', K3' and K4'.

More specifically, the OSNR is obtained using a formula at least equivalent to equation (3.11a) or (3.11b).

Optionally, the data processing unit 905 may be further configured to calculate an extended signal to noise ratio eOSNR2 according to the recorded ratios K1, K2 and K2', an extended signal to noise ratio eOSNR3 according to the recorded ratios K1, K3 and K3' and an extended signal to noise ratio eOSNR4 according to the recorded ratios K1, K4 and K4'; and calculate a signal deformation from the extended signal to noise ratios eOSNR2, eOSNR3 and eOSNR4.

More specifically, the signal deformation is obtained using a formula at least equivalent to equation (3.13b).

In detail, the optical filter unit 902 may comprises a plurality of fixed optical filters or a tunable optical filter. The functions of the optical filter unit 902, the opto-electrical unit 903, and the data collection unit 904 may also all be implemented using an optical spectrum analyzer.

In addition, the first optical signal, the second optical signal, the third optical signal and the fourth optical signal are optical signals that have different central wavelengths and same bandwidth. If the detection device 900 is employed to according to the three-wavelength approach, the first optical signal may be at the center of the optical channel bandwidth, and the second optical signal and the third optical signal may be offset toward the same side relative to the center of the optical channel bandwidth. If the detection device 900 is employed to according to the fourth-wavelength approach, the second optical signal, the third optical signal and the fourth optical signal have equidistant central wavelengths and substantially equal optical bandwidths.

Figure 10:
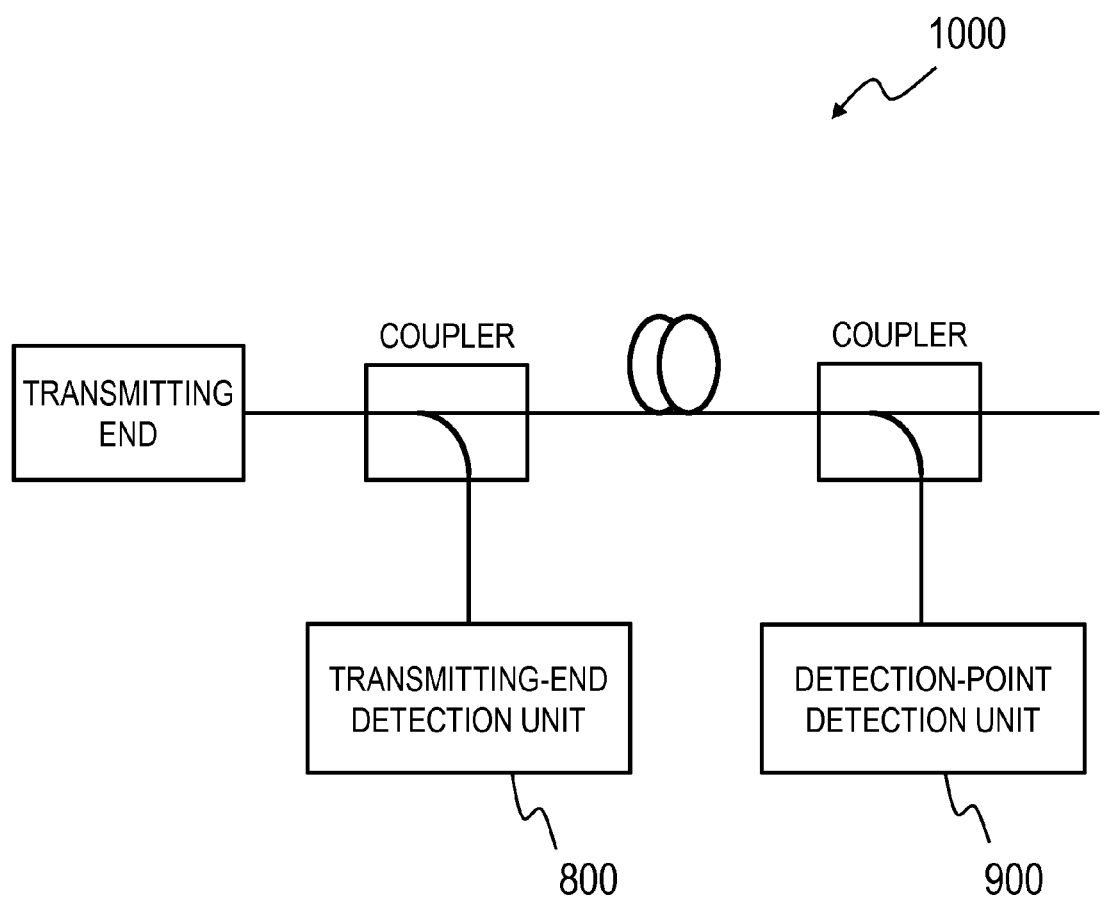
FIG. 10 is a block diagram illustrating a system for conducting the method of FIG. 5 or FIG. 7, in accordance with one embodiment.

FIG. 10 shows a system 1000 for determining a quality parameter characterizing an optical communication signal. The system 1000 includes a transmission-end detection device 800 as described with reference to FIG. 8 and a detection-point detection device 900 as described with reference to FIG. 9. The transmitting-end detection device 800 may perform detection only once at the transmitting end, and then uses the obtained ratios K1, K2, K3 and optionally K4 to characterize the optical communication signal at multiple detection points because K1, K2, K3 and K4 does not substantially vary in time in the system 1000. The detection-point detection device 900 derives the in-band OSNR or the signal deformation factor characterizing optical communication signal from ratios received from the transmission-end detection device 800 and measurements performed at the detection point.

Accordingly, from measurements acquired at three or more wavelengths, it is possible to derive the extended signal to noise ratio eOSNR(λ) as a function of wavelength, which allows for discriminating wavelength-dependent signal deformations due to NLE from the wavelength-independent ASE contribution. For example, the signal deformation contribution may be derived from an empirically determined relation of the "slope" of the extended signal to noise ratio eOSNR(λ), by means of acquisitions taken at least at three wavelengths. The OSNR may then be derived from the average of the extended signal to noise ratio eOSNR(λ) over the sets of measurements and the determined signal deformation contribution.

In another embodiment, the OSNR may be obtained from the second-order derivation of OSNRe(λ), by means of acquisitions performed at four or more wavelengths.

The signal deformation SD may then also be related to the impact of NLEs on system performance.

The embodiments described above are intended to be exemplary only. The scope of the invention is therefore intended to be limited solely by the appended claims.

What is claimed is:

1. A method for determining a quality parameter characterizing an optical communication signal, the method performed by a signal detection device and comprising:
   obtaining a signal power P1 of a first optical signal at a transmitter end, a signal power P2 of a second optical signal at a transmitter end, a signal power P3 of a third optical signal at a transmitter end, and a total signal power Ps of a channel where the first optical signal, the second optical signal and the third optical signal are located, wherein the first optical signal is at a central wavelength of an optical channel bandwidth of said optical communication signal, and the second optical signal and the third optical signal are located on the same side relative to the center of the optical channel bandwidth;
   obtaining a ratio K1 of the signal power P1 to the total signal power Ps and a ratio K2 of the signal power P2 to the signal power P1 and a ratio K3 of the signal power P3 to the signal power P1 according to P1, P2, P3 and Ps;
   obtaining a signal power P1' of the first optical signal at a detection point, a signal power P2' of the second optical signal at the detection point and a signal power P3' of the third optical signal at the detection point;
   obtaining a ratio K2' of the signal power P2' to the signal power P1' and a ratio K3' of the signal power P3' to the signal power P1' according to P1', P2' and P3';
   determining an extended signal to noise ratio eOSNR2 according to the recorded ratios K1, K2 and K2' and an extended signal to noise ratio eOSNR3 according to the recorded ratios K1, K3 and K3'; and
   determining a signal deformation factor SDF from the extended signal to noise ratios eOSNR2 and eOSNR3.

2. The method as claimed in claim 1, further comprising:
   determining an Optical Signal to ASE Noise Ratio OSNR from the determined extended signal to noise Ratios eOSNR2 and eOSNR3 and a predetermined relationship between the signal deformation factor SDF and the signal deformation SD.

3. The method as claimed in claim 1, wherein the first optical signal, the second optical signal and the third optical signal are different in central wavelength and are same in bandwidth.

4. The method as claimed in claim 1, wherein the step of obtaining a ratio K1 of the signal power P1 to the total signal power Ps, a ratio K2 of the signal power P2 to the signal power P1 and a ratio K3 of the signal power P3 to the signal power P1 according to P1, P2, P3 and Ps further comprises:
   recording the ratio K1, the ratio K2 and the ratio K3 on site or on a Network Management Information.

5. A method for determining a quality parameter characterizing an optical communication signal, the method performed by a signal detection device and comprising:
   obtaining a signal power P1 of a first optical signal at a transmitter end, a signal power P2 of a second optical signal at the transmitter end, a signal power P3 of a third optical signal at the transmitter end, a signal power P4 of a fourth optical signal at the transmitter end and a total signal power Ps of a channel where the first optical signal, the second optical signal, the third optical signal and the fourth optical signal are located, wherein the first optical signal is at a central wavelength of an optical channel bandwidth of said optical communication signal, and the second optical signal and the third optical signal are located on the same side relative to the center of the optical channel bandwidth;
   obtaining a signal power P1' of the first optical signal at a detection point, a signal power P2' of the second optical signal at the detection point, a signal power P3' of the third optical signal at the detection point and a signal power P4' of the fourth optical signal at the detection point;
   obtaining and recording a ratio K1 of the signal power P1 to the total signal power Ps, a ratio K2 of the signal power P2 to the signal power P1, a ratio K3 of the signal power P3 to the signal power P1 and a ratio K4 of the signal power P4 to the signal power P1 according to P1, P2, P3 and P4;
   obtaining and recording a ratio K2' of the signal power P2' to the signal power P1', a ratio K3' of the signal power P3' to the signal power P1' and a ratio K4' of the signal power P4' to the signal power P1' according to P1', P2', P3' and P4'; and
   determining an Optical Signal to ASE Noise Ratio (OSNR),
   the OSNR being given by a formula equivalent to the following formula:

$$OSNR = C \cdot \frac{1}{\frac{K4 - 2K3 + K2}{K4' - 2K3' + K2'} - 1}.$$

6. The method as claimed in claim 5,
   wherein the second optical signal, the third optical signal and the fourth optical signal are obtained using respective optical filters having equidistant central wavelengths and having substantially equal optical bandwidth; and
   wherein the step of determining an Optical Signal to ASE Noise Ratio employs a formula at least equivalent to the following formula:

$$OSNR = \frac{B_{CW_1}}{K1 \cdot B_r} \cdot \frac{K4' - 2K3' + K2'}{K4 - 2K3 + K2 - (K4' - 2K3' + K2')},$$

wherein BCW1 is an optical bandwidth of an optical filter CW1 from which the first optical signal is outputted, and where the Br is a reference bandwidth of noise power.

7. The method as claimed in claim 5, further comprising:

determining an extended signal to noise ratio eOSNR2 according to the ratios K1, K2 and K2', an extended signal to noise ratio eOSNR3 according to the ratios K1, K3 and K3' and an extended signal to noise ratio eOSNR4 according to the ratios K1, K4 and K4';

determining a signal deformation from the extended signal to noise ratios eOSNR2, eOSNR3 and eOSNR4, wherein the signal deformation is obtained using a formula at least equivalent to the following formula:

$$SD = \frac{eOSNR2^{-1} + eOSNR3^{-1} + eOSNR4^{-1}}{3} - OSNR^{-1}.$$

\* \* \* \* \*